T. Silliman,

Animal Trap.

N° 89,352. Patented Apr. 27, 1869.

Witnesses:
Jos. L. Kyton
John J. Chew

Inventor:
Thos. Silliman
W. D. Baldwin
Atty.

United States Patent Office.

THOMAS SILLIMAN, OF THREE RIVERS, MICHIGAN.

*Letters Patent No. 89,352, dated April 27, 1869.*

IMPROVED ANIMAL-TRAP.

The Schedule referred to in these Letters Patent and making part of the same.

*To all whom it may concern:*

Be it known that I, THOMAS SILLIMAN, of Three Rivers, in the county of St. Joseph, and State of Michigan, have invented certain new and useful Improvements in Animal-Traps, of which the following is a full, clear, and exact description.

My invention relates to that class of traps which is sprung by the weight of the animal; and the improvements herein claimed consist—

First, in the combination, with the turning top of a trap, of a bait-receptacle, a lever fulcrumed on the top, and a ring attached to the lever, and surrounding the bait, whereby the trap is sprung by the weight of the animal upon the lever, as hereinafter described.

Second, in the combination with the turning top of a trap, and vertically-moving levers, arranged one on each side of the top, of stops, released by slides, attached to the levers, and devices, to prevent the top from turning until the stops are released, as hereinafter described.

In the accompanying drawings, which make part of this specification—

Figure 1:
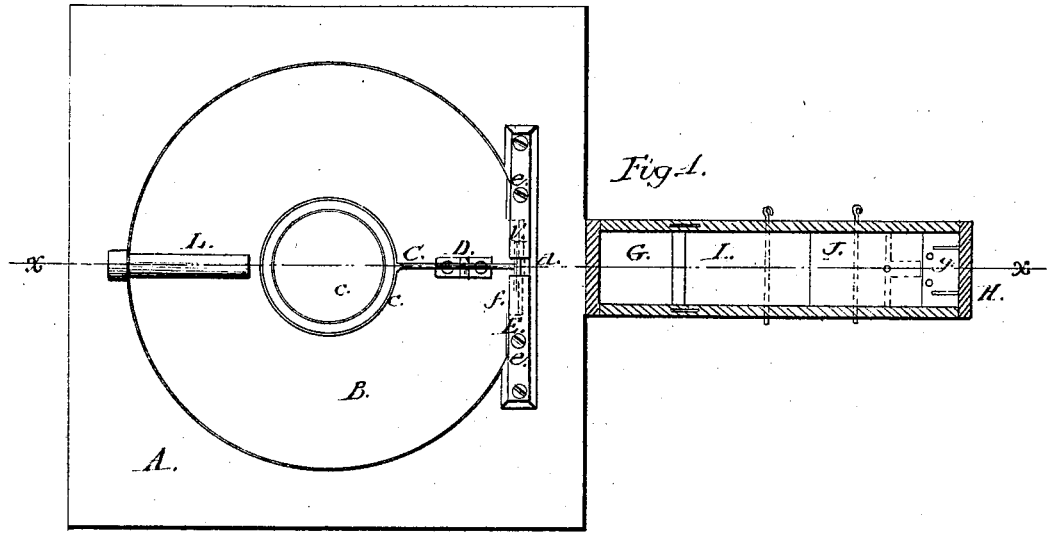
Figure 2:
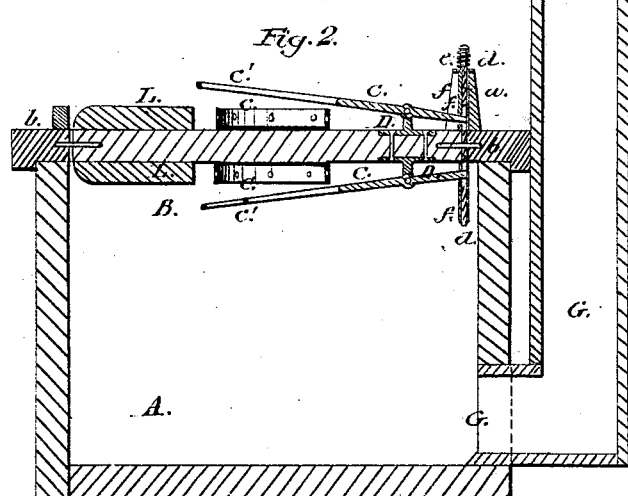

Figure 1 represents a plan view, partly in section at the line $y\,y$ of fig. 2, of a trap embodying my improvements.

Figure 3:
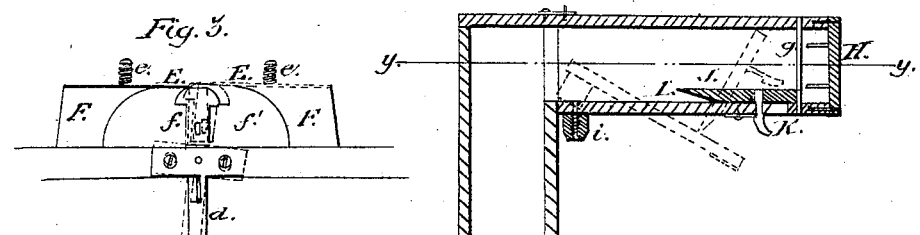

Figure 2, a vertical section of the same, at the line $x\,x$ of fig. 1; and,

Figure 3, a view in elevation of the devices for setting and springing the trap.

A represents a box, which is provided with a top, B, turning on pivots $b$, and having on its upper and under sides a bait-receptacle $c$, each surrounded by a ring, $c'$, forming the ends of levers C, which are fulcrumed upon the top at D, near its edge.

The short arms of the levers move vertically, in slots, in a metal strip $d$, fixed to the top at its edge, and projecting above and below it.

One end of this strip $d$ rests (when the trap is set) between the ends of metal strips E, secured at their opposite ends upon the projection F.

These arms E, are held down by springs $e$, or, if preferred, they may be of spring metal, and the springs $e$ dispensed with.

Upon the stops $d$ are slides $f$, with rounded tops, moved by the levers C, to press up the spring-strips E, and leave the top free to turn. When the top turns, the stops $d$, and slides $f$, turn freely in the recess $f'$ in the face of the projection F, which is secured upon the box just outside of the top.

An opening, G', in the side of the box A, near its bottom, leads into a passage G, terminating in a detachable box, provided with a grating $g$, at its end, and a removable cover H, provided with pins, upon which bait may be secured when it is desired to use this box alone for a trap.

A bottom, I, to which is secured, at one end, a weight $i$, is pivoted, so as to tilt when an animal treads upon the forward part of the pivoted board J.

This board J carries a catch, or stop, K, to hold up the bottom I.

The operation is as follows:

Bait is tied in the caps, and the trap set, as shown in the drawings. The animal gets upon the top, and is prevented from standing directly in the line of the pivots by the ledges L.

In attempting to secure the bait, the animal's feet rest upon the ring $c'$, depressing it, and elevating the slide $f$, leaving the top free to turn, which it does instantly, throwing the animal backwards into the box.

As the opposite side of the top comes upward, the other end of the strip, or stop, $d$, passes beneath one of the spring-strips E, but is stopped by the other strip, and the trap is thus automatically set.

The animal, after being dropped into the box, passes along the passage G, into the second trap, the bottom of which is prevented from tipping at the forward end by the lever $f$, and is also prevented from tipping, prematurely, at the opposite end by the catch K.

When the animal treads upon the forward end of the lever-board J, the bottom I is left free to tilt by the backward and upward movement of the catch K. The tilting of the bottom closes the entrance from the passage G, and the board J prevents the animal from advancing. The animal is dropped into water, or may be secured alive.

The weight $i$ returns the bottom to its former position.

What I claim as my invention, and desire to secure by Letters Patent, is—

1. The combination, with the turning top B of the bait-receptacle $c$, and the lever C surrounding the bait, and fulcrumed on the top, substantially as and for the purpose set forth.

2. The combination, with the self-setting turning top, and vertically-moving levers, of the stops $d$, the slides, and the spring-strips, substantially as and for the purpose set forth.

In testimony whereof, I have hereunto subscribed my name.

THOMAS SILLIMAN.

Witnesses:
  E. H. LOTHROP,
  E. A. EGNY.